United States Patent [19]

Braun

[11] Patent Number: 4,808,102
[45] Date of Patent: Feb. 28, 1989

[54] APPARATUS FOR HANDLING AND TRANSFERRING A MOLDED ARTICLE

[75] Inventor: Robert C. Braun, Bloomingdale, Ill.

[73] Assignee: Duraco Products, Inc., Streamwood, Ill.

[21] Appl. No.: 122,929

[22] Filed: Nov. 19, 1987

Related U.S. Application Data

[60] Continuation-in-part of Ser. No. 92,394, Sep. 2, 1987, abandoned, which is a division of Ser. No. 812,356, Dec. 23, 1985, Pat. No. 4,719,059.

[51] Int. Cl.$^4$ .............................................. B29C 45/42
[52] U.S. Cl. ..................................... 425/150; 198/536; 414/222; 414/224; 425/588
[58] Field of Search ...................... 264/334, 336, 40.1, 264/40.5, 328.1, 328.11, 335, 297.2; 425/150, 556, 588, 436 RM, 436 R, 437, 438, 444, DIG. 102; 198/536; 414/222, 224, 416, 749

[56] References Cited

U.S. PATENT DOCUMENTS

| | | | |
|---|---|---|---|
| 2,425,362 | 8/1947 | Cherry et al. | 414/749 |
| 3,277,521 | 10/1966 | Strauss | 425/436 |
| 3,756,107 | 9/1973 | Pax et al. | 414/749 |
| 4,363,595 | 12/1982 | Reichenbach et al. | 414/749 |

Primary Examiner—Jay H. Woo
Assistant Examiner—Timothy W. Heitbrink
Attorney, Agent, or Firm—John L. Schmitt

[57] ABSTRACT

An apparatus for handling and transferring an article formed in an injection molding machine includes a pair of spaced tracks. Inner ends of these tracks are positioned below a mold carried by the machine with the tracks positioned transversely to opening and closing movement of the mold by the machine. On these tracks is a slideable basket which may be moved from the track inner end to an outer end away from the machine. The basket is operatively connected to a pneumatic drive operated by a controller. During forming of the article, the basket moves under the mold. When forming is complete, the mold opens and the article ejected. The article falls into the basket which has a cushioney surface to inhibit damage. Opening of the mold is sensed by the controller to activate the pneumatic drive and move the basket and article to the track outer end where the article is removed. Concurrently the mold closes to begin a further forming cycle. The controller includes a timing device to reactivate the drive and return the basket to a position beneath the mold in time to receive the now formed further article.

7 Claims, 4 Drawing Sheets

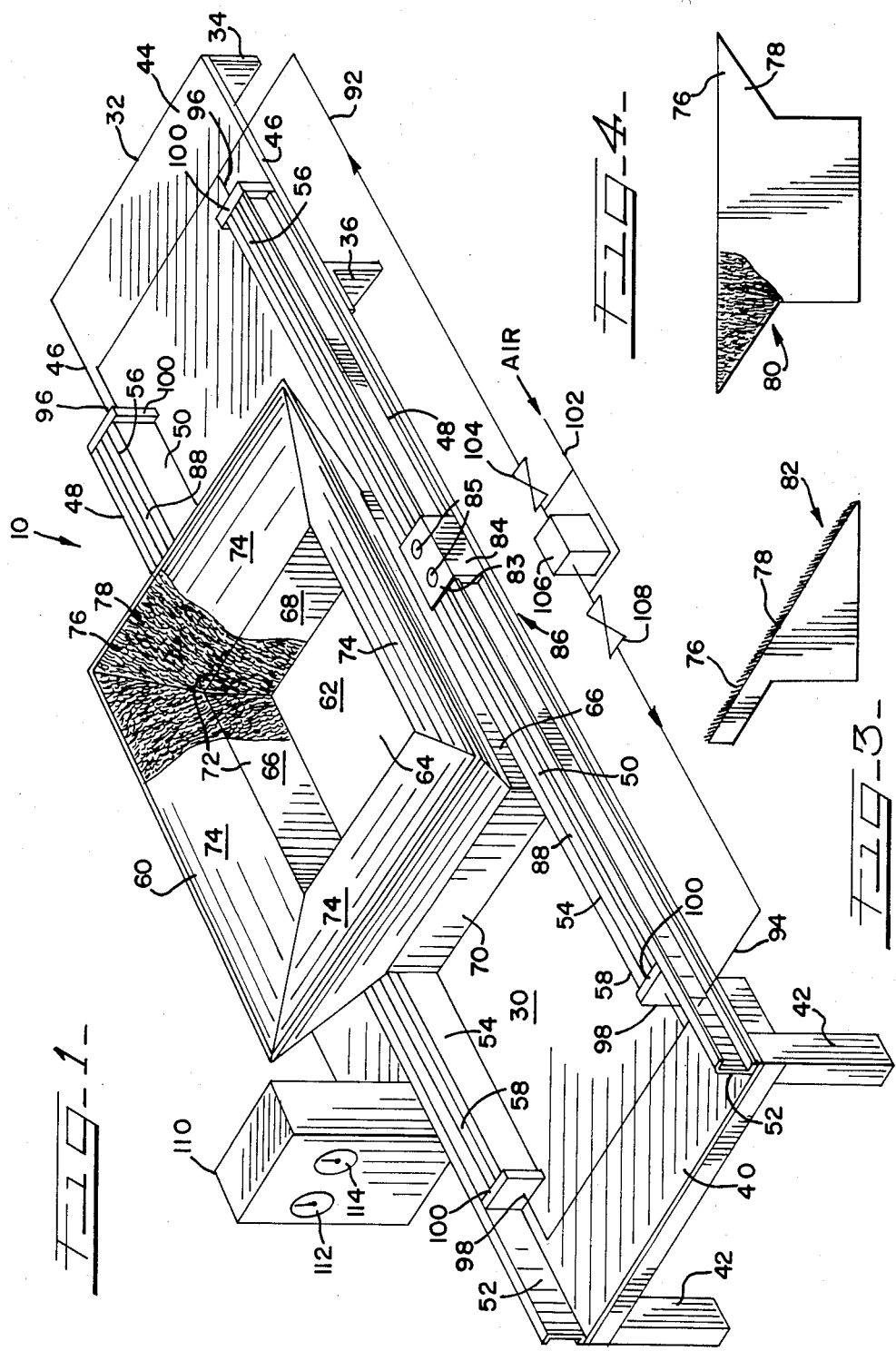

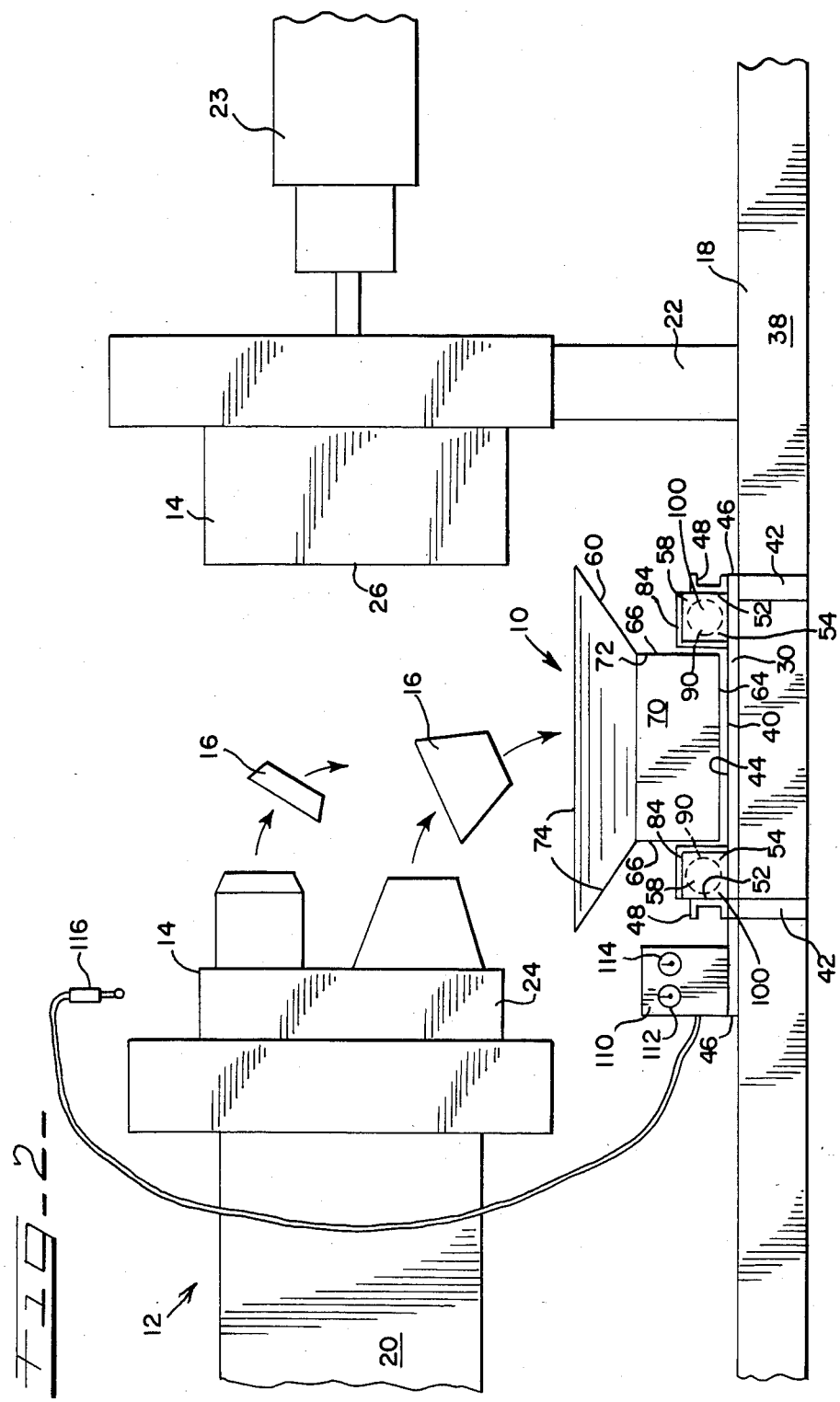

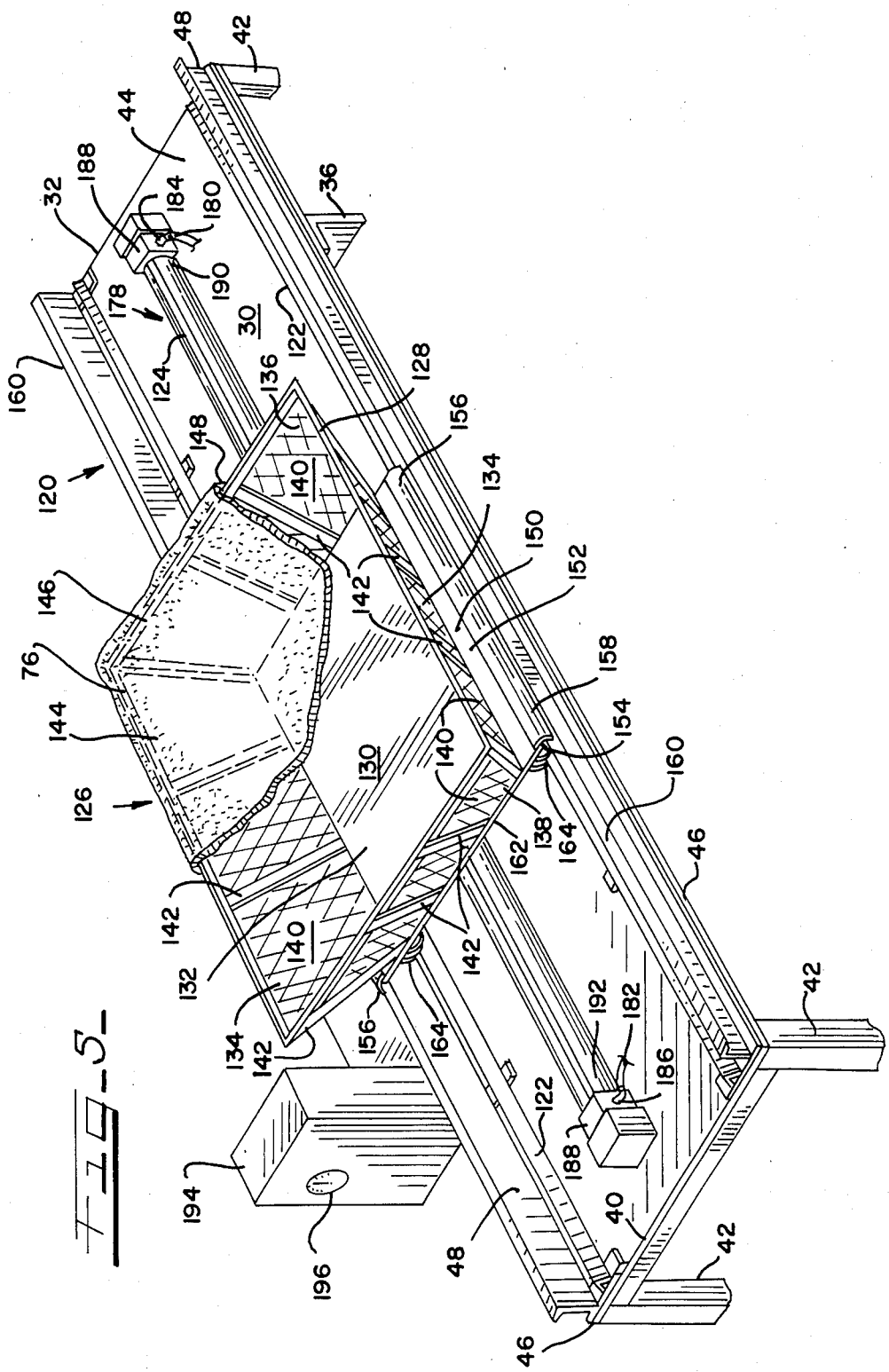

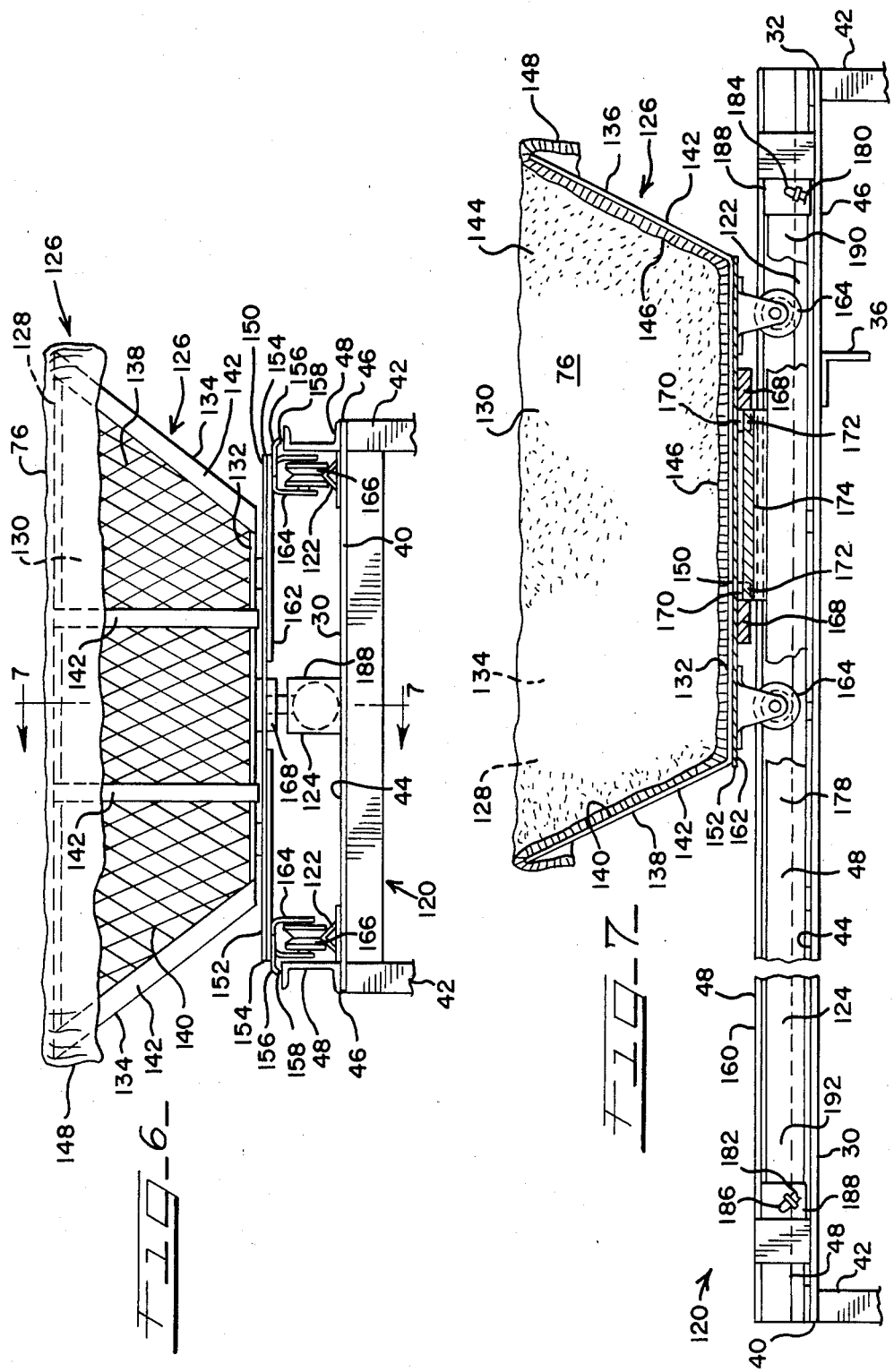

APPARATUS FOR HANDLING AND TRANSFERRING A MOLDED ARTICLE

This application is a continuation-in-part of now abandoned application Ser. No. 092,394, filed Sept. 2, 1987, which in turn is a division of application Ser. No. 812,356, filed Dec. 23, 1985, now U.S. Pat. No. 4,719,059.

BACKGROUND OF THE INVENTION

1. Field of Invention

This invention relates to an injection molding machine-material handling system and more particularly to a system including transfer apparatus for moving a just formed article away from an injection molding machine for further processing.

2. Prior Art

When injection molding machines were first put into use to make plastic articles, such articles were manually withdrawn from a mold or sometimes referred to as a die, of the machine after forming. Manual handling immediately proved to be unsatisfactory because the article was still quite hot, requiring an operator to wear heat protective clothing. Additionally, hands of the operator if caught by the mold as it closed would be readily crushed.

To overcome the problems associated with manual article removal, one solution was to place an end of a standard belt-type conveyor under the machine mold. When the mold opened after forming, mechanical means such as stripper pins in the mold separated the formed article from the mold so that the article would fall onto the moving conveyor belt below. While an improvement, use of such a conveyor did not prove to be totally satisfactory. Lubricant from the mold also would fall and collect on the conveyor belt. If not removed, an article coming into contact with this lubricant could incur surface damage sufficient to impair surface quality to a degree that the article must be rejected. Article rejection was particularly likely where the article required a high quality surface finish.

Consequently, various other mechanical means have been developed to handle an article just formed in a mold or press. Examples of such means are set forth in U.S. Pat. Nos. 2,425,362, 3,277,521, 3,756,107 and 4,363,595. The '362 reference discloses apparatus having a pair of stripper fingers which move into an open die to dislodge a just formed part from an upper portion of the die. The dislodged part then falls onto a receiving plate located above a lower portion of the die. Next, the receiving plate is withdrawn to a position clear of the die where an ejector plate pushes the part off of the receiving plate.

The assembly of the '521 reference is similar in some respects to the '362 apparatus except that it has an oscillating comb which moves into the open die to separate the culls and runners which connect the various parts during the forming from those parts. The separated parts fall onto a tray which is then withdrawn. During outward movement of the tray an outer end of the tray is guided downward to tip the tray so that the parts on the tray slide into a container. The culls and runners on the comb in turn are removed by a scrapping blade as the comb is withdrawn to fall into a further container.

The collection mechanism of the '107 reference is particularly adapted for use with a press. This mechanism may be selectively tilted so that a receiver may be reciprocated into an open die to receive a part formed therein. The receiver is carried on a slideable mount having a shaft operatively connected to a reciprocating arm which in turn is connected to a rotary drive.

The apparatus of the '595 reference has a moveable loading bar assembly defined by a series of spaced apart bars. The bars are formed with longitudinal slots. The assembly may be moved into a molding machine such that parts being held on stations in the machine become positioned in the bar slots. After the stations are lowered, the assembly first moves outward and then inward again. During this further inward movement a cam follower on the assembly engages a stop block causing the assembly to tilt whereby the formed parts slide in a receptacle.

SUMMARY OF THE INVENTION

Material handling apparatus and related system of this invention for shuttling just formed component parts or finished articles from a plastic injection molding machine includes a moveable basket. This basket has an inner holding space defined in part by spaced sidewalls which connect with an inner and outer end wall. A bottom of the basket and the walls are covered with a readily replaceable, cushioney material to provide the basket with a damaging-resistant inner surface. The configuration of the basket holding space may be modified by insertion of a divider panel or deflection panel depending on the size and shape of the article to be carried in the basket.

Connecting with each basket sidewall is a slide block which in turn seats on a guide tube. Each guide tube has a longitudinal slot covered by a metal band. A downward projecting rib on each block depresses the band to seat in a recess in a piston positioned inside each tube.

The guide tubes define a pair of tracks for sliding movement of the basket between an inner end located under a mold carried by the machine and an outer end positioned remotely from the machine. The track is positioned transversely to opening and closing movement of portions of the mold of the machine.

Alternatively, two pairs of caster-like wheels may be attached to the basket bottom. Each wheel is formed with a V-shaped groove. The wheels of each pair align so that the grooves operatively fit on a pair of inverted V-shaped tracks. In this case, there is only one guide tube which is positioned between the tracks and has its slide block operatively connected to a bottom of the basket.

Basket movement is effected by connecting ends of the guide tubes or tube to a supply of pressurized air through a solenoid operated two-way air valve. This valve is selectively activated by a controller operatively connected to the molding machine, the transfer apparatus and an electric power source.

During operation the basket is moved under the mold just before forming of an article is complete. Once forming is complete, the machine draws the mold portions apart whereupon the formed article is ejected from the mold. Immediately after ejection the mold is closed to begin another forming cycle.

From the mold the article falls in a relatively controlled manner into the basket below. Opening of the mold activates the controller which may have a single timer or two timers. In the first instance the single timer and air valve are energized. In the second instance a first timer is energized which upon lapse of its timing period energizes the air valve. In each case the air supply is connected to an inner end of the guide tube or tubes so that the basket is driven to an outer end of the track. An operator at this outer end then removes the article from the basket for further processing as may be required.

In the first instance where the controller includes only the single timer, the timing period is set to lapse after the article is removed from the basket but before forming of the further article in the mold is complete. In the second instance where the controller includes two timers, lapse of the first timing period also activates a second timer to start a second timing period. This second period lapses after the article is removed from the basket but before the forming cycle is complete. Thus, in each case lapse of the timing period reactivates the air valve to connect the guide tubes or tube outer end with the air supply. The now empty basket is returned to the track inner end beneath the mold during a final portion of the article forming cycle.

The apparatus for handling and transferring a molded article of this invention provides several important advantages over other like known devices.

A first advantage is that the operation of this apparatus is substantially independent of the operation of the molding machine. Thus, the rate at which the machine may produce articles is not reduced by operation of the apparatus. Note that where a robotic device having an arm with a mechanism to grasp or otherwise receive the article is used to remove the article from the mold, that arm cannot be activated until the mold is open. Additionally, the mold cannot be closed until the arm and article have cleared the mold. As a consequence, the rate of article production is slowed by use of a mechanical device which must first enter the machine and then leave the machine with the article. Because the apparatus of this invention does not enter the machine, it does not impede the rate at which articles may be produced.

A second advantage is that the effective rate of article production is increased in that very few articles need be rejected due to damage occurring during the material handling step. It should be appreciated that as an article is ejected from the mold it is still quite hot and where made of thermoplastic also quite soft. Also, many plastic articles require a high quality finish to be commercially acceptable. By controlling the fall of the article into the basket holding space which has a cushioney, damaging-resistant surface, damage to the article is inhibited. Where the article does not fall in the desired manner the basket walls merely deflect the article into the basket holding space.

Article rejection rate is still further reduced by being able to readily remove and replace the cushioney material on the basket. Note that operation of the machine and mold requires lubrication which inadvertently drips from the mold. This lubricant may combine with ambient practicles of dirt to soil the cushioney material on the basket where it comes in contact with the basket. A white colored surface of an article may be impaired by contact with a soiled area of the material, for example. To increase the useful life of the material, the time during which the basket is held below the mold is kept to a minimum. To facilitate maintenance, the basket is readily removeable and the cushioney material readily removeable and replaceable. Thus, a basket with dirty material may be easily replaced by a basket with clean material. Being able to remove the basket also provides easy access to the machine when maintenance to the machine is required.

A still further advantage of this material handling apparatus and related system is that it promotes operator safety and operator efficiency. Note that the operator does not have to reach into the machine to handle the article but is at a safe distance from the molding machine during handling. Further, the basket holding space reliably locates the article. As noted above, an insert may be required to promote proper article location in the basket. By locating the article for operator handling in the same place each time an article is formed, the operator may be maintained in an optimum position to perform a further manufacturing step, for example placing the article in a protective bag in preparation for storage or shipping.

DESCRIPTION OF THE DRAWINGS

FIG. 1 is a perspective view of the apparatus for handling and receiving a molded article of this invention.

FIG. 2 is an end elevation view of the apparatus of FIG. 1 as would be seen when the apparatus interacts with an injection molding machine.

FIG. 3 is a side elevation view of a deflection panel which also may be used in a basket of the apparatus.

FIG. 4 is a side elevation view of a divider panel which may be placed in a holding space of the basket of the apparatus to divide the holding space.

FIG. 5 is a perspective view of a further embodiment of the apparatus of this invention.

FIG. 6 is an elevation view of an outer end of the apparatus of FIG. 5.

FIG. 7 is a sectional view as seen generally along the line 7—7 of FIG. 6.

DESCRIPTION OF THE PREFERRED EMBODIMENTS

Apparatus particularly adapted for handling and transferring a plastic component part or finished article between locations is shown generally in FIG. 1 and designated 10. As seen in FIG. 2, the apparatus 10 has been attached to an injection molding machine 12 carrying a mold 14. This mold 14 may have from one or more cavities to form a like number of articles at the same time. As shown, the mold 14 has two cavities to form two such articles 16. In this case the articles 16 are a decorative pot and supporting plate for an indoor plant. Such plants presently are quite popular and in wide use in homes and offices.

The machine 12 is conventional in nature having a base 18 carrying a moveable ram 20 and a stationary support 22 to which a plastic injection unit 23 is connected. The mold 14 comprises a male portion 24 carried by the ram 20 and a female portion 26 also attached to the support 22. As shown in FIG. 2, the mold portions 24,26 have been drawn apart to open the mold 14 with the articles 16 being ejected from the mold 14.

The apparatus 10 includes a platform 30. Attached to an inner end 32 of the platform 30 is an end bar 34 and an intermediate support angle 36. The bar 34 and angle 36 are spaced apart to fit closely on each side 38 of the machine base 18 with the platform 30 resting on the machine base 18 and positioned transversely thereto. An outer end 40 of the apparatus platform 30 is supported by a pair of legs 42.

Attached to a top side 44 of the platform 30 along each side edge 46 of such is a channel 48. The channels 48 extend from the platform outer end 40 to a point proximately midway between the end bar 34 and intermediate angle 36. A guide tube 50 is attached to an inner side 52 of each channel 48. The tubes 50 comprises a track 54 having an inner end 56 and outer end 58 for movement of a basket 60 therebetween.

The basket 60 has an inner holding space 62 defined by a bottom 64, sidewalls 66 and connecting inner and outer end walls 68,70. Joined to a top portion 72 of each basket walls 66–70 is an outward and upward sloped peripheral wall portion 74. The basket bottom, walls and sloped wall portions 64–70 and 74 are covered with a cushioney material 76 such as a carpet (only shown in part) to form a damaging resistant surface 78. The basket holding space 62 may be divided into smaller compartments by a divider panel 80, see FIG. 4 also covered with the material 76 to have a similar damaging resistant surface 78. Additionally, a deflection panel 82 having a like surface 78, see FIG. 3, may be placed in the basket inner space 62 or the compartments formed by the divider panel 80.

A mounting bracket 83 is attached to each basket sidewall 66 which in turn is secured to a slide block or yoke 84 by a set of pins 85 allowing the basket 60 to be readily removed from the apparatus 10 for replacement of the material 76 or maintenance to the machine 12. The blocks 84 are operatively carried on the guide tubes 50. The slide blocks 84 and guide tubes 50 form part of a pneumatic drive 86 commercially available from Origa Corporation of Elmhurst, Ill. The drive 86 is not shown in detail but is briefly described to aid in understanding this invention. Each tube 50 is formed with an upper longitudinal slot (not shown) covered by a band 88. Each block 84 has a downward projecting rib or bearing strip (not shown) which under the load of the basket 60 depresses the respective band 88 to seat in a recess (not shown) in a piston 90 positioned inside each tube 50.

To effect movement of the pistons 90 and operatively attached basket 60 between the inner and outer end 32,40 of the platform 30, two air lines 92,94 connect respectively with inner and outer end inlets 96,98 in end plates 100 attached to ends of the tubes 50. The inner end air line 92 joins tube inlets 96 to an air supply line 102 through one side 104 of a solenoid operated two-way air valve 106. An opposite side 108 of the air valve 106 connects the air supply line 102 with tube outer end inlets 98 through the air line 94. The air valve 106 in turn is operatively connected to a controller 110 which includes a first timer 112 and a second timer 114. The first timer 112 is operatively connected to a limit switch device 116 mounted on the machine 12 so as to be activated by movement of the male mold portion 24 when the mold 14 opens.

During production of the articles 16 the injection molding machine 12 is operated in a conventional manner with plastic resin being forced under high pressure and a high temperature into the mold 14 when closed by the injection unit 23. The time to form one set of articles 16 may be as long as 30 seconds depending on the size of the articles 16. When forming is complete, the mold 14 opens with the male mold portion 24 being drawn away from the female portion 26 by the machine ram 20. The articles 16 are ejected from the mold male portion 24 by air and movement of a stripper ring or pins forming part of the mold 14. The force applied to eject the articles 16 is closely regulated to produce a controlled fall where the articles 16 follow a path of movement to come to rest in an undamaged condition in the basket holding space 62. On those few occasions where the fall of the articles 16 deviates from the desired path, the articles 16 first contact the basket sloped wall portions 74 and then are guided by such into the basket inner holding space 62.

Note that when the mold 14 has two cavities positioned in a side-by-side relationship, the divider panel 80 may be placed in the basket 60 to prevent contact between the articles 16 as they come to rest in the basket inner holding space 62. Additionally, when it is desirable to have the articles 16 come to rest in close proximity to one particular basket sidewall 66, the deflection panel 82 may be placed in the basket 60. The deflection panel 82 may be sized for use with or without the divider panel 80.

When the mold 14 opens, this movement is sensed by the limit switch 116 to close a circuit and energize the first timer 112 and start a first timing period. After several seconds the first timing period lapses to close a further circuit and energize the air valve 106 to open the inner valve side 104 and connect the guide tube inner end inlets 96 with air in the air supply line 102. The flow of air drives the pistons 90, the basket 60 and the articles 16 to the platform outer end 40. Lapse of the first timing period also closes another circuit to energize the second timer 114 and start a second timing period.

The second timing period lapses after approximately 20 seconds. The second timing period is sufficiently long for the basket 60 to travel to the platform outer end 40 where an operator may remove the articles 16 for a next manufacturing step as may be required. Because the articles 16 are consistently located by the basket 60, the operator may maintain an optimum position to perform this next step in a safe and efficient manner. At all times the operator is at a safe distance from the machine 12.

When the second timing period lapes, a still further circuit is closed to again energize the valve 106 to open the valve outer side 108 and connect the air supply line 102 with the guide tube outer end inlets 94. The pistons 90 and now empty basket 60 are returned to platform inner end 32 under the machine mold 14. The lapse of the second timing period is regulated so that the basket 60 is only under the mold 14 for the several seconds before the mold 14 opens to eject a further set of just formed articles 16. Minimizing the time that the basket 60 is beneath the mold 14 minimizes the opportunity for lubricant on the mold 14 to drip on the cushioney material 76 and form a soiled area. Were the articles 16 to come into contact with such an area, a surface of the articles 16 could be damaged to the extent that the articles 16 must be rejected.

A further embodiment of this inventive system and related apparatus for handling and transferring a molded article is shown generally in FIGS. 5–7 and designated 120. Like reference numbers are used to identify like structural elements of the two apparatus embodiments 10 and 120.

The apparatus 120 also includes a platform 30 carried by legs 42. While not shown, these legs 42 and the intermediate support angle 36 allow the apparatus 120 to be positioned in a like manner with respect to the molding machine 12 where the inner end 32 of the platform 30 may fit beneath the mold 14 of the machine 12. Likewise, attached to the top side 44 of the platform 30 along each outer edge 46 of such are channels 48. In this case the channels 48 extend from the platform inner end 32 to its outer end 40.

Also attached to the platform top surface 44 is a pair of inverted V-shaped tracks 122 which are positioned slightly inward respectively from the channels 48. In this case a single guide tube 124 is located between the tracks 122. This single guide tube 124 is identical to the guide tubes 50 of the first apparatus embodiment 10 and therefore is not described again in detail.

The apparatus 120 includes a basket assembly 126 comprising a basket 128 having an inner holding space 130 defined by a bottom 132, outwardly sloped sidewalls 134 and connecting inner and outer sloped end walls 136,138. These walls 134-138 may be made from expanded metal pieces 140 and then held together by support members 142. The basket bottom 132 and walls 134-138 also are covered with the cushioney material 76. This material 76 may be formed by stitching together two sidewall carpet pieces 144 and an end wall-bottom piece 146. These pieces 144,146 may be fitted into the basket 128 and are held in place in part by upper edge flaps 148.

The basket bottom 132 is attached to an upper side 150 of a plate 152. Along each outer side edge 154 of the plate 152 is a guard 156. Each guard 156 has an arcuate shaped, downwardly extending flanged edge 158 that fits close to a top surface 160 of each channel 48 respectively. Secured to a bottom side 162 of the plate 152 are two pairs of caster wheels 164 with each wheel 164 in turn formed with circumferential V-shaped groove 166. The caster wheels 164 of each pair align respectively and are spaced apart to operatively engage the tracks 122.

Also attached to the plate bottom side 162 is a pair of longitudinally spaced apart yoke blocks 168. An end of each yoke block 168 is formed with a notch 170. The blocks 168 are spaced apart and so positioned that the notches 170 are located in an opposing manner and as such may engage ends 172 of a slide block or yoke 174 of the guide tube 124 of a pneumatic drive 178 of the apparatus 120. The yoke 174 is operatively joined to a piston (not shown) located inside the drive tube 124.

In a like manner to effect movement of this piston, inner and outer end air lines 180,182 are connected respectively with an inner and outer end air inlets 184,186 in end plates 188 attached to an inner and outer end 190,192 of the guide tube 124. While also not shown, it should be understood that the apparatus 12 includes a high pressure air supply system that comprises a two-way, solenoid operated air valve similar to the valve 106 shown in FIG. 1 for the apparatus 10.

The air supply system for the apparatus 120 is operated by a controller 194 that includes a single timer 196. Also not shown, the apparatus 120 similarly includes a limit switch which is mounted on the molding machine 12 similar to the limit switch 116 shown in FIG. 2. This latter limit switch likewise is operatively connected to the controller 194.

During the operation of the system, when the mold 14 opens, the basket assembly 126 is positioned under the mold 14. The just formed article is ejected from the mold 14 and falls into the basket 128 below. The basket 128, like that of apparatus 10, catches the article in a damage inhibiting manner. The mold 14 then closes immediately to begin a further forming cycle.

The opening movement of the mold 14 operates the limit switch to close a circuit to energize the air valve and the single timer 196 of the controller 194. The air valve through the inner end air line 180 connects the drive tube inner end 190 to the air supply. The piston in the drive tube 124 and operatively connected basket assembly 126 are driven to the outer end 40 of the platform 30. An operator positioned at this outer end 40 then removes the article from the basket 128.

The timing period of the single timer 196 is set to be slightly less than the time period of a forming cycle of the molding machine 10. For example, if the forming cycle is 30 seconds, the timing period is set for 25 seconds. Thus, the timing period of the single timer 196 lapses after the operator has removed the article from the basket 128 but before forming of the further article in the mold 14 is complete.

Lapse of the timing period causes the single timer 196 to close another circuit and energize the air valve. The air supply then is connected to the drive tube outer end 192 through the outer end air line 182 and outer end air inlet 186. The piston in the drive tube 124 and the attached basket assembly 126 are driven to the inner end 32 of the platform 30 in time to receive the now completed further article as it is ejected from the mold 14. The cycle may now begin again.

While embodiments of this invention have been shown and described, it should be understood that this invention is not limited thereto except by scope of the claims. Various modifications and changes can be made without departing from the scope and spirit of the invention as the same will be understood by those skilled in the art.

What is claimed:

1. An injection molding machine-article transfer apparatus system comprising:
    an injection molding machine having a mold defined by a male and a female portion, and
    apparatus for receiving an article formed in said mold during a forming cycle of said machine, said apparatus further including,
    a platform having a first end positioned under said mold,
    a pair of spaced apart tracks attached to a top side of said platform, said tracks extending from said platform first end to a platform second end located away from said machine,
    a basket movably carried on said tracks, said basket having walls covered with a cushioney material to define an inner space to catch in a damage inhibiting manner said formed article upon ejection of said article from said mold,
    drive means carried by said platform and connected to said basket to effect movement of said basket between said platform ends, and
    control means operatively connected to said mold and to said drive means, said control means upon sensing an opening of said mold activates said drive means after said article has been ejected and caught by said basket to move said basket and said article to said platform second end for removal of said article and then reactivates said drive means to return said basket to said platform first end during a final portion of said machine forming cycle,
    wherein said machine may operate at maximum output as said apparatus remains free from interferring with said machine operation.

2. A system as defined by claim 1 and further characterized by,
    said basket having sets of grooved-wheel casters attached to a bottom thereof with said wheels engaging said tracks, and said drive means comprising a guide tube positioned between said tracks with said basket bottom having spaced apart yoke blocks to engage ends of a yoke of said guide tube,
wherein said basket may be readily engaged or disengaged from said tracks and said guide tube.

3. A system as defined by claim 1 and further characterized by,
said control means including a limit-type switch attached to said machine to selectively engage said mold male portion and sense said mold opening, and a single timer connected to said switch and activated by said switch sensing said mold opening to start a timing period, and
said drive means including an air valve connected to said control means switch and said timer, and between an inner end and an outer end of a guide tube and an air supply, said valve activated by said switch sensing to effect said basket outward movement, and said valve reactivated by a lapsing of said timing period during said machine forming cycle final portion to effect said basket inward movement,
wherein said basket cushioney material remains substantially free from dirt produced during operation of said machine by minimizing the time said basket remains below said mold.

4. Material handling apparatus particularly adapted for transferring articles formed in an injection molding machine, said apparatus comprising:
a pair of spaced apart tracks positioned transversely to said machine with a first end of said tracks positioned beneath a mold carried by said machine and a second end of said tracks located remotely from said machine,
a basket defined in part by sidewalls positioned between said track, mounting means attached to said sidewalls and in operative engagement with said tracks, an inner holding space defined by a bottom, said sidewalls and connecting inner and outer end walls, and a cushioney material attached to said bottom and said walls to provide a damage inhibiting surface,
drive means formed as part of said track and said basket mounting means to produce movement of said basket between said track ends, and
control means having a sensing device carried by said mold to sense movement of said mold from a closed condition to an open condition, a first timing device operatively connected to said sensing device and said drive means, and a second timing device operatively connected to said first timing device and drive means,
wherein said mold opens to eject an article formed therein into said basket positioned under said mold with said mold then closing immediately after said ejection to start forming a next article, said mold opening movement activating said sensing device to energize said first timing device and start a first timing period, said first timing period lapsing to selectively energize said drive means to move said basket and said article to said track outer end for removal, said lapse of said first timing period also energizing said second timing device to start a second timing period, and said second timing period lapsing to re-energize said drive means to return said empty basket to said track inner end in time to receive said next article being ejected from said mold.

5. Material handling apparatus as defined by claim 4 and further characterized by,
said cushioney surface of said basket having a carpet-like texture.

6. Material handling apparatus as defined by claim 4 and further characterized by said drive means including,
guide tubes in part defining said tracks,
a piston positioned in each said guide tube with said pistons operatively connecting with said basket mounting means respectively,
an inner and outer end air inlet formed in end plates attached to respective ends of said guide tubes,
a two-way solenoid operated valve having an inner side connected to each said guide tube inner end inlet by an inner end air line and an outer side connected to each said guide tube outer end inlet by an outer end air line, and
an air supply line connected to an inlet of said value.

7. Material handling apparatus as defined by claim 4 and further characterized by,
said mounting means comprising a bracket attached to each said basket sidewall and a slide block carried on each said track with said brackets and said slide blocks joined respectively by a set of pins allowing said basket to be readily removed from said track for maintenance on said basket cushioney material or said molding machine.

* * * * *